United States Patent
Palani et al.

(10) Patent No.: US 10,148,812 B2
(45) Date of Patent: Dec. 4, 2018

(54) METHOD OF PLAYING MUSIC PRIOR TO ESTABLISHING A PHONE CALL

(71) Applicant: OnMobile Global Limited, Bangalore (IN)

(72) Inventors: Venkatesan Palani, Bangalore (IN); Florent Stroppa, Bangalore (IN); Arvind Singh, Bangalore (IN); Christelle Chauveau, Bangalore (IN); Vishwas Karanth, Bangalore (IN)

(73) Assignee: ONMOBILE GLOBAL LIMITED, Bangalore (IN)

(*) Notice: Subject to any disclaimer, the term of this patent is extended or adjusted under 35 U.S.C. 154(b) by 0 days.

(21) Appl. No.: 15/701,995

(22) Filed: Sep. 12, 2017

(65) Prior Publication Data

US 2018/0077280 A1 Mar. 15, 2018

(30) Foreign Application Priority Data

Sep. 12, 2016 (IN) .............................. 201641031102

(51) Int. Cl.
*H04M 3/42* (2006.01)
*H04W 4/60* (2018.01)
*H04M 1/00* (2006.01)
*H04L 29/08* (2006.01)
*H04W 80/12* (2009.01)

(52) U.S. Cl.
CPC ......... *H04M 3/42017* (2013.01); *H04M 1/00* (2013.01); *H04M 3/42178* (2013.01); *H04W 4/60* (2018.02); *H04L 67/1097* (2013.01); *H04M 2250/64* (2013.01); *H04W 80/12* (2013.01)

(58) Field of Classification Search
CPC ....... H04W 4/60; H04W 4/004; H04W 4/003; H04M 3/42017; H04L 67/1097
USPC .................................. 455/414.1–4; 386/241
See application file for complete search history.

(56) References Cited

U.S. PATENT DOCUMENTS

| | | | | |
|---|---|---|---|---|
| 2005/0117726 A1* | 6/2005 | DeMent | ............ | H04M 3/42017 379/142.01 |
| 2007/0287477 A1* | 12/2007 | Tran | .................. | H04L 29/06027 455/466 |
| 2015/0304375 A1* | 10/2015 | Dhillon | ............... | H04L 65/4007 370/259 |

* cited by examiner

*Primary Examiner* — Congvan Tran
(74) *Attorney, Agent, or Firm* — Knobbe Martens Olson & Bear LLP (57) ABSTRACT

This present invention disclosure relates to a method for playing music prior to establishing a phone call. It specifically relates to music discovery and playing the music for around 8 seconds, when a person makes a call from his mobile phone. Since music is played from the user's phone, there is no telecom network integration required. Additionally, the disclosure provides discovering songs based on user's context and collecting the songs thereof.

5 Claims, 5 Drawing Sheets

METHOD OF PLAYING MUSIC PRIOR TO ESTABLISHING A PHONE CALL

CROSS REFERENCES TO RELATED APPLICATION

This application claims the benefit of priority to Indian Patent Application No. 201641031102, filed on Sep. 12, 2016, the disclosure of which is hereby expressly incorporated by reference in its entirety.

TECHNICAL FIELD

The present invention disclosure relates to a method for playing music prior to establishing every phone call i.e. for a time duration of few seconds when a dialer completes dialing the number till the ringtone starts ringing at the receiver end. Specifically, the method is enabled to play music for 8 seconds before establishing a mobile phone call without network integration. Further, the invention disclosure relates to discovering songs based on user context and collecting the songs thereof.

BACKGROUND

In the music space today, there are a number of applications and services that tackle the problem of discovering new music. Users look for new content such as new music tracks, new games, new apps, new movies, new stickers on messaging apps and new media such as animated GIFs.

Spotify is one of the applications which is enabled to create around 1.5 billion playlists targeting a large set of different customer profile such as workout enthusiasts, commuters, millennial generation, and young parents. It has also developed advanced profiling of users based on age, gender, rich location and behavioral data, moods, music trends and many more aspects. It has lately introduced weekly discover playlist based on recommendations. Music discovery is seen as a very important pillar of Spotify. The strategy that Spotify seems to be pursuing is based on Big Data, i.e. they are trying to make sense of the extremely large set of data they have in order to build a relationship about between user profiles, context and musical tastes.

Another recent music discovery application is Shazam. When people hear a song that they like or are intrigued about, they can pull Shazam and the song is recognized. Based on the number of times a particular song is shazamed in a given location, the application is able to tell which new songs are the most popular new songs. Their data can therefore predict the success of new artists.

In the aforesaid examples, the user is expected to pull their device, click on the application, search, wait and listen. Those services require that the user make the conscious decision to discover music. The user is active and the process is not effortless.

Interestingly, radio is still today the most important medium for new music discovery. Radio is a passive music discovery service. The user simply needs to turn the radio on, choose a channel and sit back (or in many cases, drive). But it is very rare that the listener likes all the music being played. If the music is really disliked, the user either suffers the pain of listening to the entire song or changes channel. The process involves effort.

In the present technology, it is required to integrate with the telecom network to play music during the call over mobile network. Hence, there are limitations of buying timely subscriptions and that too for playing specific tone, every time a user calls on that number.

Also, currently, discovery of songs based on user's context and certain parameters such as time and date, weather, contact name of the person called, calendar event, geolocation, particular action that the end-user is doing, etc. does not exist.

SUMMARY

In order to alleviate at least the aforementioned drawbacks of the existing art, the present invention disclosure relates to music discovery that is both effortless and painless, and playing the music for around 8 seconds of music when a person makes a call from his mobile phone. It helps user to listen 8 seconds of music with MP3 quality even before it starts connecting with other person. Instead of just listening to the tick, tick sound, it permits to play 8 seconds of music clip.

Due to this invention, the call neither gets dropped nor gets delayed at any point of time. Since the song is being played from the phone, there is no telecom network integration required.

The method is effortless because it is passive and the user does not have to do anything. The method is also painless because it is a bit-sized content. Instead of listening to the full song, the end-user listens to 8 seconds.

In addition, the invention discloses a method and system that has the ability to discovering and pushing a song based on user's context, instead of expecting the user to select either a playlist or a song, which is known in the art.

According to an embodiment of the invention, a method for playing music prior to establishing a call, the method comprising pre-fetching more than one music clip from a mobile application server on a mobile phone, buffering the fetched music clip on the mobile phone, initiating a call from the mobile phone and playing a pre-fetched music clip for a predetermined duration on the mobile phone while the call is being established.

According to another embodiment of the invention, the predetermined duration on the mobile phone is 8 seconds.

According to yet another embodiment of the invention, the music clip on the mobile application server is provided by a content management system.

According to another embodiment, the content management system provides the music clips based on a specific rule.

According to still another embodiment of the invention, the specific rule depends on a playlist report generated by the content management system.

According to another embodiment, the playlist report comprises of user preferences.

According to another embodiment, the user preferences further comprise of content consumption of user based on at least selection of genre, date, week, month, geography and language.

According to an embodiment of the invention, buffering of the music clip requires an active data connection.

According to further embodiment of the invention, the system comprises a mobile phone for establishing a call, a mobile application server, wherein the mobile application server is in communication with the mobile phone, and a content management system, wherein the content management system is in communication with the mobile application server, wherein the content management system provides more than one music clip to the mobile application server which are pre-fetched and buffered on the mobile phone and the pre-fetched music clip is played for a predetermined duration on the mobile phone while the call is being established.

According to another embodiment, a cloud storage service communicates with the mobile application server.

BRIEF DESCRIPTION OF FIGURES

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Exemplary embodiments will now be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

The method disclosed in the present invention disclosure provides a way to discover music because it does not require any extra effort from the end-user and uses a moment in our daily life which is currently being wasted: the time between making a phone call and the called party answering the phone.

The method works in the background, i.e. the end-user clicks on "Call" and a new song extract is played. Unlike other music applications in the market, the user does not need to open the application to discover music.

According to an embodiment, it enables the callers to discover a new song every time they make a call. There is no delay in making a phone call and it does not impact the quality of the call. It is just making a phone call more fun and helps users find unknown gems.

The tracks are in the highest codec definition for maximum listening to pleasure. The tracks are played locally by this method. While the service is technically similar to a Reverse RBT service, it does not require the operator infrastructure to work because the music is played by the application itself. The tracks are pre-fetched before playing and buffered in the application. Therefore, it can work without a data connection when it plays the extract of a song. It only needs data connection to update its buffer with new songs.

The service surprises the user with music on every call on a daily basis. This creates a strong awareness of the service compared to most applications in the market that are just sitting on the mobile home screen or in the application drawer. Every day, the user is reminded of the service and through a smart notification system, the end-user is able to quickly check the music track, she liked, while waiting for someone to pick-up the phone.

Most streaming services believe that they can create the perfect playlist for users based on their official taste of music and various other parameters such as age, location, gender and other personal parameters. In those services, people are typically telling what "genres" they like and, in the case of Apple Music, how much they like them, for instance, there are 2 degrees of liking in Apple Music.

In this method, the aim is not to find the perfect playlist that people will love, because we believe it is not possible to perfectly predict human taste. We believe that people need to be challenged with new things.

So instead, a system closer to the radio is designed. On the radio, people listen to stations and switch between them. People start following some "genres". Contrary to streaming service, "genre" is not a tag, it is a "virtual user" on the system and those virtual users will have their playlist like radio.

As an example, Alice likes Rock, Pop and Reggae songs. She will follow "Rock", "Pop" and "Reggae" and those three virtual users will have their own list of tracks that will be played to Alice in sequence.

The beauty of this approach is that it is an extensible system: In Phase 1, it starts with virtual accounts representing musical taste. In Phase 2, it is possible to invite DJs, Radios, and even Artists to the system. In Phase 3, the end-users themselves are invited and people are then able to follow each other.

The method is made available for free to users. There is no subscription fee or any other hidden charges to users. However, the service may be monetized with mobile ads and service referrals towards music streaming service, music download services and ringback tone services.

Based on the availability of the RBT platform, it is possible to propose the end-user to set the same song as RBT than the one the user heard by this method.

For instance, a user from India hears song in the present method and he would like his callers to listen the same song when they call him. So he goes ahead and requests the same song to set as RBT. The same scenario is not possible in countries such as Russia or China due to unavailability of RBT platform.

There are several concepts associated to this service that are explained as herein below:

Call screen: It shows the notification of a song that user discovers during the call. It displays the song title and artist information without impacting to the dialer screen.

Feed Screen: The newsfeed screen contains both song and profile information. It shows the list of played tracks, song image along with contacts details. In additions to the above, native ads will also show up on the same page when the user scrolls the page.

Users are allowed to do activities in the Feed page, such as like and dislike, Share the songs with friends, Deep link and Track details.

Using the share option, user can share the song to his friends with short URL with just a click. The advantage of deep link is that it takes an existing user to the relevant track and for a new user, it requests him to download the application.

Track screen: Track detail allows the users to further interact from the feed page. If a user likes a track, he can stream the song from the leading music streaming services such as Spotify. This feature depends on the location and country of the user.

It is also possible for the user to set the same song as his RBT based on the current location of the user**. *It is expected that CMS will have an integration with the leading streaming player using digital signature or ISRC code. **RBT service will be available based on presence of the RBT platform of the present invention in that country.

Figure 1:
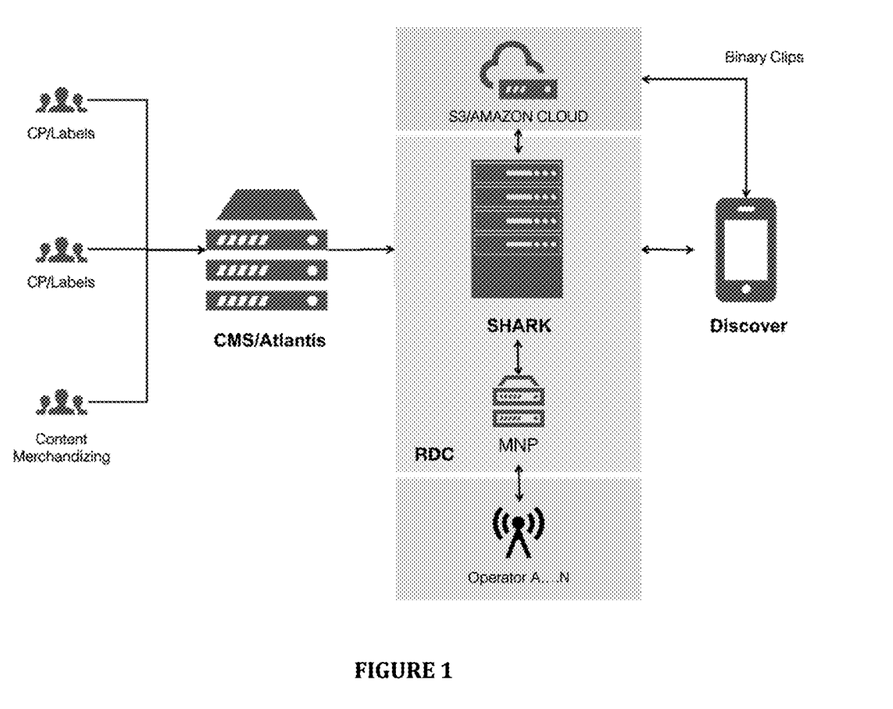
FIG. 1 is a schematic diagram illustrating components of the system, according to an embodiment of the present disclosure.

FIG. 1 illustrates a Deployment architecture according to an embodiment of the present invention. SHARK is the Mobile Application server developed for the present invention. Following components are involved in the architecture and refer the brief functionality of each component.

Figure 2:
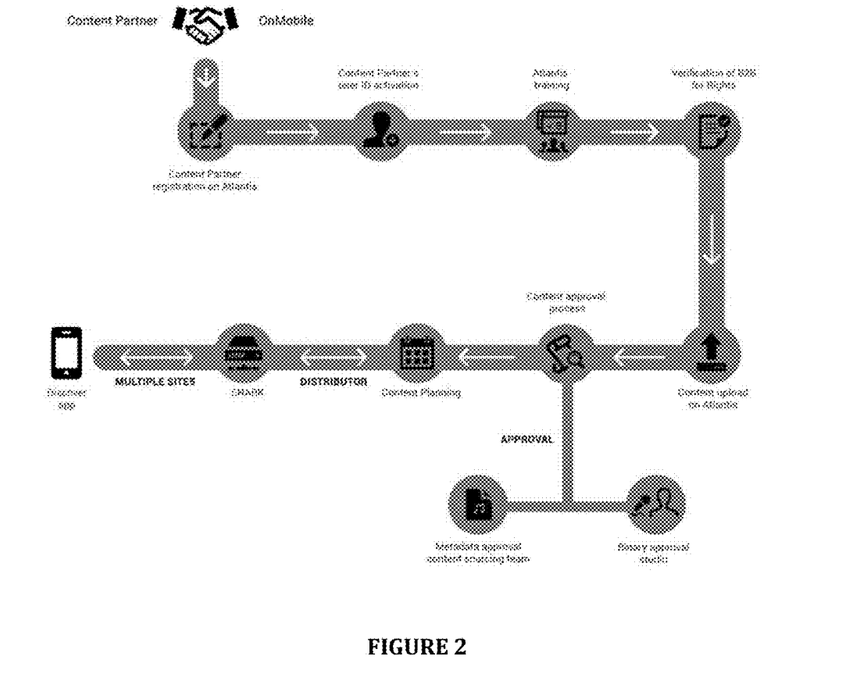
FIG. 2 illustrates Atlantis content flow diagram of the system according to an embodiment of the present invention disclosure.

As illustrated in FIG. 2, Atlantis content flow diagram is disclosed. Atlantis is the Content Management System (CMS) that allows content providers to upload, categorize the content, and provide Meta data for the content. The central server distributes content to Atlantis distributor that is co-located in the data center.

The Distributor receives content in MP3 format and converts it into AAC (Advanced Audio Coding) format. The AAC format has several advantages over MP3, such as: it has much more efficient compression scheme allowing the files to be smaller. This helps the application to download the clip faster without compromising on the audio quality. It also reduces the overall data bandwidth consumption lowering the cost for both the end-user and for the server.

Post conversion of clips from MP3 to AAC, the distributor pushes the song clips to S3 hosted in the Amazon cloud. Having a distributed architecture in the cloud for song clips provides multiple advantages for regional distribution of content and easy access of content to the users of this application.

Figure 3:
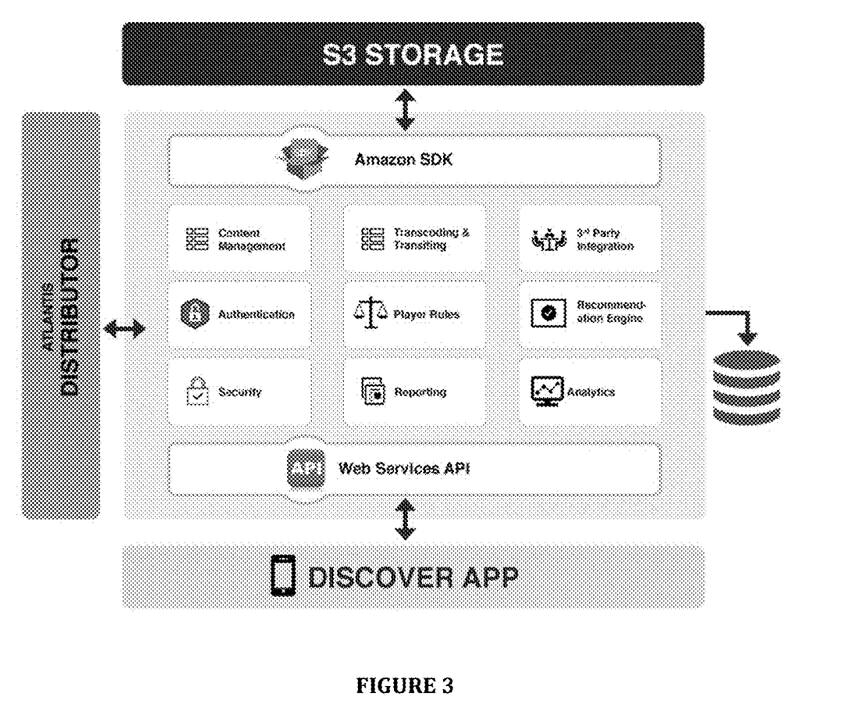
FIG. 3 is a high-level illustration of SHARK's solution architecture according to an embodiment of the present invention disclosure.

FIG. 3 is a high-level illustration of SHARK's solution architecture. SHARK is a mobile application server with REST set of API's built on top of Tomcat to support with the following modules: Content Management with MNC & MCC, Authentication, Security, Transcoding & Transiting, Player rules, Reporting, third party integration, Recommendation engine and Analytics. Third party integration is also supported in Native ads integration, Google analytics integration, third party streaming integration, Crashlytics and Helpshift.

The Content Management module is responsible for metadata and binary clip availability for S3. It also manages channels for the application. It decides which music channels to be played for a user based on MCC (Mobile Country Code) and MNC (Mobile Network Code). MCC identifies a user's country whereas; MNC identifies a user's service provider. Based on MCC, the music channels will be played to the users suiting their music sensibilities and trends. MNC will be used for setting RBT for users, if need be.

Apart from pushing clips to the application upon getting requests; it also ensures that the channel categorization, defined by Atlantis, is replicated within Shark too.

Three types of authentications are done based on the user activities.

Login authentication—SHARK is integrated with Facebook and Gmail that will allow the users to log in to their server account using their Facebook or Gmail user credentials.

Mobile number authentication: This authentication is used if a user wants to set a clip as his/her RBT. An OTP will be sent to the user's registered mobile number for verification.

$3^{rd}$ Party authentication/integration: SHARK is also integrated with third parties such as Spotify, Gaana.com. So, if users wish to listen to the full song of a clip, they can directly log in to one of the third parties' application and listen to the song.

Using the symmetric encryption method, the files are encrypted before uploading to S3 and the same encrypted contents get downloaded by the application and decrypted before playing in the handset. This ensures that even if users get access to the files, they are not usable in any way. Also, since the files stored in the handset are also encrypted, any other music player other than the application cannot play them. Those files can be played by the application only.

During the encryption by the server and decryption by the client, automated PINs will be generated. Users cannot play the clips using any other music application without entering the PIN, which they do not have access to.

Transcoding & Transiting module converts the content in MP3 format into AAC (Advanced Audio Coding) format. The AAC format has efficient compression technology making the files smaller compared to MP3s'. This helps the application to download files faster without compromising the audio quality. It also reduces the overall data bandwidth consumption hence, lowering the cost for both the user and server.

This module also helps in resizing the clips into required durations (8 secs, 10 secs, 12 secs) without manual intervention.

Another module named Player Rules module defines the logic for sending clips to a user based on the number of clips consumed by the user.

SHARK gets regular updates about users through the application such as how many calls were made by a user and the number of clips consumed, et al. For example, if a user is left with 4 clips of the 10 to be used, SHARK, as per one of Player Rules logic, will replace the used 6 clips with the new ones, therefore, ensuring the user gets uninterrupted flow of clips without any repeats.

Various reports are generated to understand the content consumption and user preferences. One of them is Playlist based reports.

Playlist followed by user—This report provides details like how many playlists are being followed by the users by date, week, and month and also cumulative counts of the users on any given playlist.

How many people un-followed channel—It gives the history of the playlist followers.

Language wise channel followed count—This report explains the language based playlist count.

Geography wise channel followed count—This report provides details of the playlists followed by geography.

Second kind of reports are Content based reports, which include:

Content Download Report—This report provides the details about the content consumption based on the user by date, week, month, geography, language and also which part of the playlist.

Content Played Report—This report provides the details like how many contents were played for a user by date.

Content likes—This report provides the details about content likes by user, geography and language.

Content Shared—It provides the content share details of a user.

Leads clicked Report—It provides the details about the leads.

Another kind of reports are User reports, which comprise of the following:

Total Subscribers Reports—They provide the details of the user base that downloaded application.

Total Active Subscribers—They provide the details of active users.

Yet another kind of reports are Ads reports, which may include:

Ads displayed Report—This provides the details of how many ads displayed to each user.

Ads clicked by the user—This provides the details about how many ads were clicked by a user.

Third Party Integration is possible for any third party to integrate with SDK. SHARK's REST APIs are modular and extensible making it flexible to either integrate with a third party or allowing a third party to integrate with it.

Recommendation Engine analyzes consumer preferences based on their clip selections. The statistical information is used for sending clips of user's preferred taste of music. Such personalized recommendation will enhance users' stickiness to the application.

Analytics: SHARK uses Google Analytics for gathering insights into user behavior for enhancing user experience with regard to application usability and better service. The data gathered will help to tap into the user segment that is highly active, luring the dormant ones and gaining users loyalty towards the application.

Figure 4:
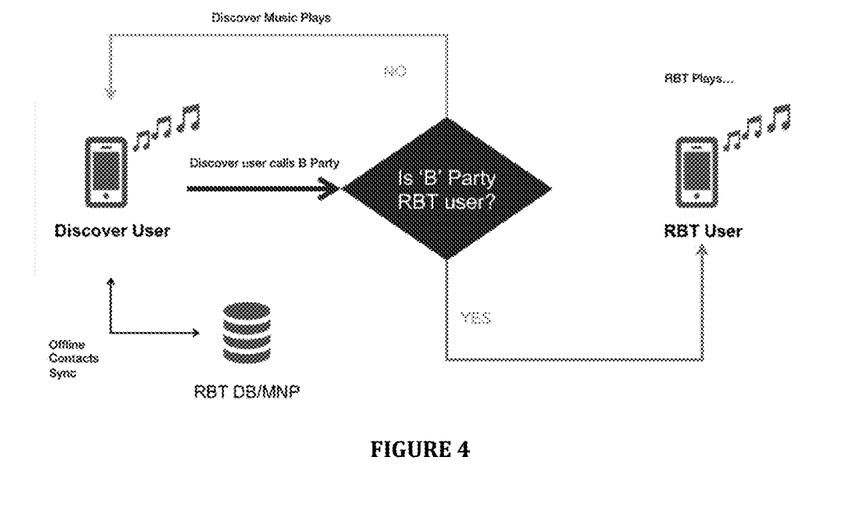
FIG. 4 illustrates a method of identification of RBT users, according to an embodiment of the present invention disclosure.

FIG. 4 illustrates the method of identification of RBT users. The figure explains how the application works with RBT users. The expectation from the application is that the song from the application should not be playing to calling party if he subscribed to RBT. The working of identification of RBT users is explained as follows:

The user's phone book contact has been synced with operator RBT/MNP information to identify the RBT user. Based on the response from the RBT/MNP data base, the client stores the information at the client application. The application identifies the user status in real time and decide to play or not based on the information available at the application contacts. The Sync between the application contacts and RBT DB is available with configuration and it's an offline process happening in the background. The status of RBT user and contacts information are fully secured and it's not available for even user access.

According to an embodiment of the present invention disclosure, Visualizer is a graphical representation of the media playing, from audio point of view. Android provides visualizer class which gives values on the basis of audio. These values can be converted into mathematical calculations which can be used to draw different shapes. The invention here lies in representing bass, mid and treble in circular shape on the basis of audio playing.

In music discovery application which has different channels and the channels can be changed by rotating a circular control known as "knob". This visualizer circles (bass, mid and treble) are drawn around the knob.

Here the values given by the visualizer are converted into frequency and amplitude.

This frequency can categorized into bass, mid and treble on the basis of frequency range. Hence, the shape is shown with frequency and amplitude.

Figure 5:
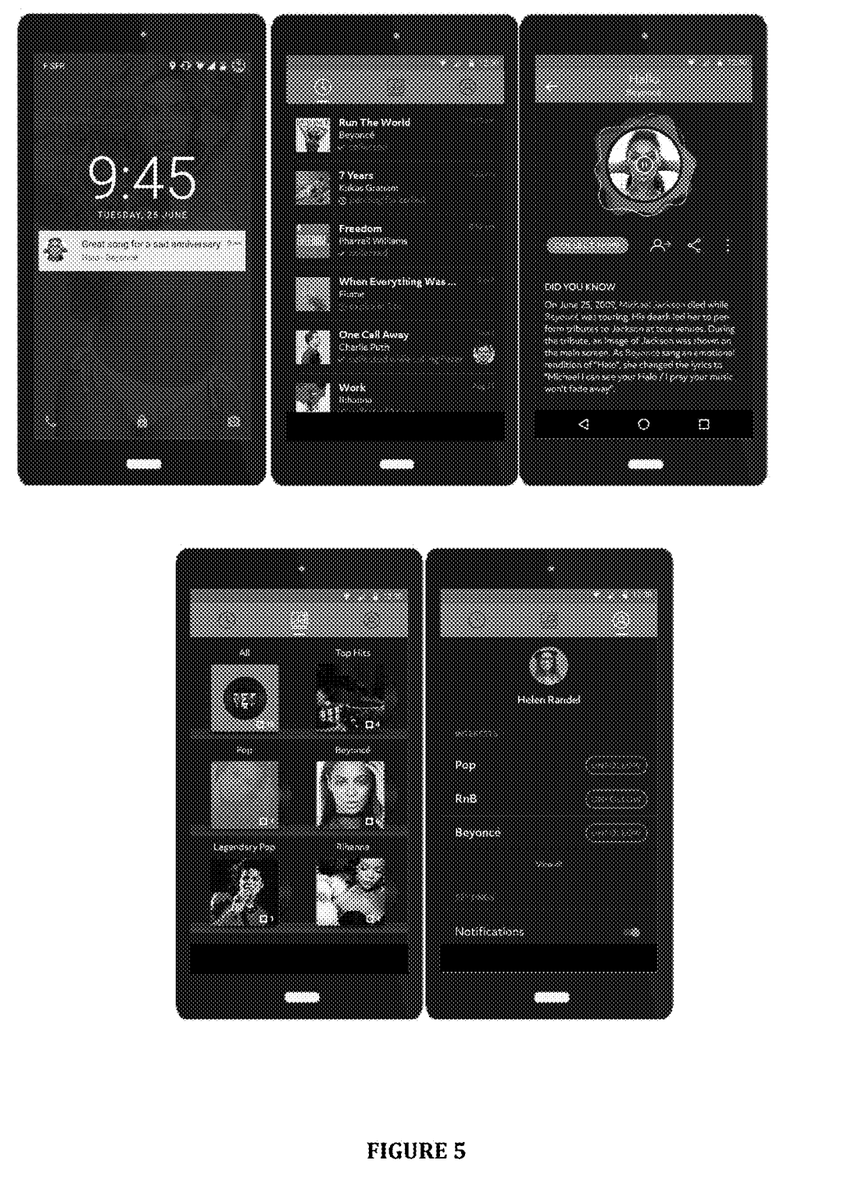
FIG. 5 illustrates screen shots to depict Context based song discovering and collecting along with status of song collection, according to an embodiment of the present invention disclosure.

As illustrated in FIG. 5, context based song discovering and collecting along with status of song collection is depicted, according to a preferred embodiment of the present invention disclosure. It provides a system that has the ability to push the song based on user's context as opposed to expect the user to select either a playlist or a song.

User context may be of the following kinds and for each context, examples are cited herein below:

| CONTEXT | OVERVIEW & EXAMPLES |
| --- | --- |
| Occurrence | There are specific occurrences like the first time you are using the service, or the 100th songs that you have played. |
| Anniversary | After one year playing with the service. |
| Weather | This is potentially really fun. Many songs talk about the weather and having a song specifically for the weather that people experience is a nice touch.<br>For instance:<br>It's raining again - Supertramp |
| City visited | New York<br>Amsterdam<br>Paris (Paris s'éveille") |
| Geo-location | Abbey Road |
| Agenda | Based on specific personal event of the end-user, specific songs will be pushed to the user |
| Contact status | Inform the caller with a contextual information related to the callee<br>for instance letting the caller knows that it is the callee's birthday<br>letting the caller knows that the callee is |

| CONTEXT | OVERVIEW & EXAMPLES |
|---|---|
| | in a different time-zone letting the caller knows that the last time she called the callee was 12 days ago. |

In practice, the primary elements include the following:

Context-based sound hunting: Instead of having songs being pushed to the end-user based on the channels they have followed, the songs will be pushed based on the user context (time and date, weather, contact name of the person called, calendar event, geo-location, particular action that the end-user is doing). This makes sure that the end-user relates to the song.

Rich meta-data: when the song is pushed to the end-user not only the context is made clear but there is also interesting information presented to the end-user about the song.

The packaging around the content is composed of the following items:

The notification teaser may be defined as a piece of text that needs to be short enough to be read on a notification (around 20 characters). This text is teasing the end-user to click on the notification.

The context trivia is a longer piece of text (around 300 characters) that help making sense of the notification teaser. This is the part of the meta-data that generates the "haha" moment.

The song trivia is a piece of text (around 600 characters) about the song which is both entertaining and interesting for the user.

According to one of the embodiments, the afore-mentioned three elements are created for each song by creative team using various stories/events/incidents and many more contexts etc. All of this information is unique to each song and it is created in advance by team.

Those elements make sharing much more likely. Since the information is interesting and it is related to the end-user, the end-user does not share the music, rather the end-user shares the story around the music.

A song is pushed due to a particular context and once the end-user clicks for more details, she gets to understand the context.

Few reasons of pushing a song may include, a particular fact about the song that is related to the current context: date, time, weather, name of contact and other personal context. The reason would be presented, for instance as "Did you know? Did you know that 5 years ago Prince was . . . ?"

Another reason may be the fact that she likes a particular artist or a particular genre. The reason would be "You have shown interest in RnB" in a similar fashion that Google Now pushes articles.

Yet another reason may be a promotion from a new artist. In this case, it is clear that it is a promoted content.

In specific, a notification is pushed to the end-user, when the user makes a phone call. When the user clicks on the notification, she gets a detailed view, the "Sound item view" with information that are either instructive or fun. On the "Sound item view", the end-user can listen to the song, share a link to the "Sound item view" page (with a permalink) to friends. The user can also "collect" the song. The ability to collect is made available only for one day. After this period, this option is gone. This forces the end-user to stay active on the service.

Other ways may be added in future version (V1 or V2) such as when the user plugs their audio headset, go to a specific location or at a specific time of the day.

According to another embodiment, the end-user can "collect" a song from the "Sound item view" by clicking on the "COLLECT NOW" button or doing some other actions which will be related to the song. It is not the full track that is collected, it is just a bookmark to the "Sound item view" which has a short extract of the song, the history around the sound etc.

Once a song is collected, the song extract is added to the user's collection. The user gets some reward points and the collection grows as a result.

The disclosed method provides following advantages, such as:

Setting up an account: From the mobile application, the end-user is able to register to the service through Facebook, Twitter or Email. The end-user registration is necessary to get the service. There is no 'unauthenticated' experience available for the users.

Logging in the service: From the mobile application, the end-user is able to log in. If the user has just registered, he will be automatically logged in to the system. If the end-user has logged out, he will need to log back in to get into his account.

Following music tastes: Post login, the user will be given the choice of music playlist available to him. This is a one-time activity by the user after which the songs will be played to the user whenever he makes a call. Point to be noted here is that the user doesn't have the option of selecting or choosing a song in the application.

Like and dislike: The main purpose of taking inputs from like & dislike from the user is to understand the relevancy of the playlist for end-users. The songs the disliked will never be played again to him. However, this is not used to tailor a different playlist. As explained in the Following music taste section, the end-user chooses the "genres" that he wants to follow, the same way that people on twitter follow other twitter accounts. If a tweet is "disliked", it does not change anything to the accounts being followed.

Un-follow music tastes: The end-user can decide to un-follow a particular genre if he is really not satisfied about the playlist quality.

Share: Users can share a song with their friends, family and connections. The recipient will receive the deep link of the song which will allow him to preview it. This will create more viral effect for the song and make it more popular among the users. It will also enable the user not belonging to this application, to download the application automatically to experience music and download more songs, eventually making him an application user.

The user may benefit from the invention in certain additional ways, such as:

Firstly, user could get to know more information about song/preferred genre of music and artist. It is possible to share and announce to his friends about his skills on genre of music. It is also possible to interact/meet artists based on the performance.

The invention also permits making friends with possible contacts who has the same music taste.

The user could buy ringtone or ringback tone (RBT) or full-track songs, as another additional feature.

What is claimed is:

1. A method for playing music prior to establishing a call, the method comprising:
 (a) pre-fetching more than one music clip from a mobile application server on a mobile phone;

(b) buffering at least one music clip, from the more than one music clip fetched in (a), on the mobile phone; and (c) playing the at least one music clip buffered in (b) for a predetermined duration on the mobile phone after initiating a call from the mobile phone and until the call is established;

wherein a content management system provides the music clips based on a specific rule, the specific rule depending on a playlist report generated by the content management system, wherein the playlist report comprises a user's preferences collected using meta-data information of the user, which were previously received, stored and processed by the content management system.

2. The method as claimed in claim 1, wherein the user's preferences further comprises content consumption of the user based on at least selection of genre, date, week, month, geography and language.

3. The method as claimed in claim 1, wherein buffering of the music clip requires an active data connection.

4. A system of playing music prior to establishing a call, the system comprising:

a mobile phone;

a mobile application server, wherein the mobile application server is in communication with the mobile phone; and a content management system, wherein the content management system is in communication with the mobile application server, wherein the content management system provides one or more music clips to the mobile application server, wherein the music clips are prefetched and buffered on the mobile phone and at least one music clip, of the music clips which are prefetched, is played for a predetermined duration on the mobile phone after initiating a call from the mobile phone and until the call is established;

wherein the content management system provides the music clips based on a specific rule, the specific rule depending on a playlist report generated by the content management system, wherein the playlist report comprises a user's preferences collected using meta-data information of the user, which were previously received, stored and processed by the content management system.

5. The system as claimed in claim 4, further comprising a cloud storage service in communication with the mobile application server.

* * * * *